United States Patent

Haag

(12) United States Patent
(10) Patent No.: US 6,659,926 B2
(45) Date of Patent: Dec. 9, 2003

(54) DEFLECTION CONTROLLED ROLL

(75) Inventor: Rolf van Haag, Kerken (DE)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/200,429

(22) Filed: Jul. 23, 2002

(65) Prior Publication Data

US 2003/0022773 A1 Jan. 30, 2003

(30) Foreign Application Priority Data

Jul. 25, 2001 (DE) .......................... 100 36 270

(51) Int. Cl.[7] .................................. B23P 15/00
(52) U.S. Cl. .................. 492/7; 492/16; 492/20; 492/2
(58) Field of Search ................ 492/7, 16, 20, 492/9, 10, 11, 2; 100/162 B, 168; 162/358.3, 358.5, 375

(56) References Cited

U.S. PATENT DOCUMENTS

| | | |
|---|---|---|
| 4,282,638 A | 8/1981 | Christ et al. |
| 4,282,639 A | 8/1981 | Christ et al. |
| 5,033,176 A | 7/1991 | Schiel |
| 5,101,544 A | 4/1992 | Kubik |
| 5,383,833 A * | 1/1995 | Brugger et al. ............... 492/16 |
| 5,393,290 A * | 2/1995 | Lehmann et al. ............. 492/16 |
| 5,592,875 A * | 1/1997 | Moschel ....................... 99/510 |
| 5,865,716 A * | 2/1999 | Kivioja et al. ................. 492/7 |
| 6,077,065 A * | 6/2000 | Sumiyoshi et al. ......... 425/368 |
| 6,315,703 B1 * | 11/2001 | Quack et al. ................. 492/46 |
| 6,346,066 B1 * | 2/2002 | Kivioja ......................... 492/7 |

FOREIGN PATENT DOCUMENTS

EP 0328503 8/1989

* cited by examiner

Primary Examiner—I Cuda Rosenbaum
(74) Attorney, Agent, or Firm—Greenblum & Bernstein, P.L.C.

(57) ABSTRACT

Deflection controlled roll that includes a rotating roll jacket, a rotationally fixed yoke arranged to axially pass through the roll jacket, and a plurality of hydrostatic support elements arranged on the yoke in a direction of a roll axis which are chargeable with a pressure fluid to exert a supporting force on an inner side of the roll jacket. A device for influencing a roll temperature via at least one fluid flow, which is separate from the pressure fluid is also included. The support elements are arranged into a plurality of controllable roll zones arranged along the roll axis. The temperature influencing device is structured and arranged to locally charge respective roll zones depending upon a pressure on the support elements in a respective roll zone.

33 Claims, 4 Drawing Sheets

DEFLECTION CONTROLLED ROLL

CROSS-REFERENCE TO RELATED APPLICATIONS

The present application claims priority under 35 U.S.C. §119 of German Patent Application No. 101 36 270.6 filed Jul. 25, 2001, the disclosure of which is expressly incorporated by reference herein in its entirety.

BACKGROUND OF THE INVENTION

1. Field of the Invention

The invention relates to a deflection controlled roll having a rotating roll jacket, a rotationally fixed yoke axially passing through the roll jacket, and a plurality of hydrostatic support elements which are arranged in series on the yoke in the direction of the roll axis and which are each formed by a piston in cylinder unit actuated by pressure fluid to exert a supporting force on the inner side of the roll jacket. A device for influencing the roll temperature via at least one fluid flow separate from the pressure fluid charging of the support elements is provided, with the support elements controllable individually and/or group-wise. In this manner, corresponding roll zones follow one another in the direction of the roll axis. Such a roll is described, for example, in EP-B-0 328 503.

2. Discussion of Background Information

In deflection controlled rolls or deflection compensation rolls, support sources or support elements are used which are charged with oil pressure via a supply line. The respective support source is pressed toward the rotating roll jacket by this oil pressure. Since the piston surface of the support source is smaller than the hydrostatic pocket surface facing the roll jacket, a lower pocket oil pressure is adopted. The pressure difference between the piston pressure and the pocket pressure defines the volume flow which flows via the capillaries disposed between the pocket surface and the piston surface. The respective volume flow is thus adopted at a support source in dependence on the piston pressure.

The support sources are individually charged with an oil pressure for an individual profile correction, i.e. in particular for the correction of certain transverse property profiles of the goods web, in particular of a paper web or of a cardboard web, running through the roll nip. The level of the oil pressures is regulated via an online profile thickness measurement of the goods web.

Large differences can occur between the oil pressures of the different support sources (e.g. from 3.5 to 90 bar from support source to support source) in dependence on the respectively required profile corrections. As already indicated, this results in volume flow differences at the support sources. Friction occurs between the rotating roll jacket and the support sources due to the oil shear in dependence on the jacket speed and to the oil gap level, which is in turn dependent on the volume flow, on the oil temperature and on the pocket pressure. Thus, a friction level results with a different amount from one support source to the other as a consequence of the large pressure differences and is expressed in temperature differences at the roll jacket. These temperature differences in turn have an effect on the shape of the roll jacket and thus also produce a feedback effect which influences the produced path load profile of the deflection controlled roll.

Since a lower volume is adopted with a pressure balance at a support source, a higher temperature results at this support source despite an operationally lower friction level than with higher pressures. A higher temperature now, however, results in an expansion of the roll jacket which is expressed in a path load increase in the roll nip. The temperature development is therefore expressed in the reverse direction to the desired pressure balance and is thus unwanted. In individual cases, this can even result in instability in the control behavior.

Usually, the temperature development at the support sources is limited by a separate cooling oil flow which is led into the inner space of the roll. For this purpose, a volume flow of lower temperature is distributed in the inner space of the roll via nozzles, the amount of said volume flow being controlled via the return temperature of the roll. Up to now, the same amount of cooling oil is supplied to each support source by such a distribution. However, as a consequence of the previously named volume flow differences, different temperatures are adopted at the support sources despite the supplied cooling oil amount. This state of affairs is documented by the following calculation example:

The present calculation example is a deflection compensation roll of a thickness calender, with the production speed amounting to 1540 m/min. The surface temperature of the roll is, in this case, equal to the return temperature so that no heat flow flows through the jacket.

The technical data relevant to the calculation are as follows:

| | |
|---|---|
| outer diameter: | 1016 mm |
| inner diameter: | 780 mm |
| support source size: | 70 mm piston diameter |
| oil viscosity: | ISO VG 68 (mineral oil) |
| inlet temperature: | 40° C. for all flows (support source and cooling oil). |

The temperature development and the friction level of a support source were examined in the calculation for a minimum (3.5 bar) and a maximum (90 bar) possible piston pressure in dependence on the cooling flow.

FIG. 1 shows a diagram in which the respective oil temperature resulting after a support source is shown over the secondary flow, i.e. the cooling flow, for the minimum and the maximum piston pressure of 3.5 bar and 90 bar respectively. In this connection, the temperature is given in ° C. and the secondary flow in ltr./min. The oil temperature shown was determined directly in the outlet in the direction of jacket rotation behind the support source.

In the inlet of the support source, oil is taken in underneath the support source with the running of the roll jacket at a mixed temperature which results from the injection of the cooling oil into the interior of the roll.

It can be recognized from FIG. 1 that the oil temperatures are much higher for all examined cooling oil flows at a piston pressure of 3.5 bar than at a piston pressure of 90 bar.

The mixed temperature adopted at the interior of the roll approximately corresponds to the local return temperature. FIG. 2 shows a diagram in which the calculated return temperature is entered over the cooling flow (secondary flow) in each case for the two different piston pressures. In this connection, it must be noted that in each case only one support source was examined in the calculation, i.e. a mixing of the oil from a plurality of support sources with different oil pressures and thus different temperatures remains unconsidered.

The adopted local return temperatures show an increasing temperature difference between a support source with a high load and a support source with a low load as the cooling flows become smaller. Such a temperature difference, however, now has a decisive effect on the shape of the rotating roll jacket.

SUMMARY OF THE INVENTION

The present invention provides an improved deflection controlled roll of the kind initially mentioned in which the above-mentioned problems have been eliminated.

According to the invention, a respective local charging of the different roll zones takes place by the temperature influencing device in dependence on the piston pressure of the support element or of the support element group of the respective roll zone.

Not only an optimum temperature homogenization is possible due to this design, but the fluid flow required to influence the roll temperature is also reduced.

In a preferred embodiment of the deflection controlled roll in accordance with the invention, at least some of the roll zones can be charged in each case with a cooling fluid, in particular with a cooling oil, by the temperature influencing device.

Generally, however, such a design is also conceivable in which at least some of the roll zones can each be charged with a heating fluid by the temperature influencing device, with oil preferably also again being used in this case.

In an expedient practical embodiment of the deflection controlled roll in accordance with the invention, the fluid amount locally associated with a respective roll zone by the temperature influencing device can be varied in dependence on the piston pressure of the relevant support element or of the relevant support element group.

The annular spaces of the different roll zones provided between the roll jacket and the yoke can advantageously be charged with the relevant fluid by the temperature influencing device.

The temperature influencing device can in particular include nozzles via which the relevant fluid can be injected into the respective roll zones. In this connection, a valve is preferably respectively disposed before the nozzles via which the respective fluid amount can be controlled in dependence on the respective piston pressure. The valve can in particular be designed such that it increasingly closes as the piston pressures become increasingly higher and vice versa.

In an expedient practical embodiment of the deflection controlled roll in accordance with the invention, in which in particular cooling fluid is used, the valve is designed and/or controllable such that it is at least substantially fully closed at piston pressures above a pre-settable upper limiting value and/or at least substantially fully open below a pre-settable lower limiting value.

An expedient practical embodiment is characterized in that the valve cross-section can be varied via a spring-loaded valve body which can be charged against the spring force by the piston pressure.

A constant mixed temperature at the interior of the roll can thus in particular be produced by a design of the nozzle cross-section matched to the support source size.

For the initially stated case, this means that, for example, only about 1.7 ltr./min. of cooling oil is sufficient for a support source with 3.5 bar piston pressure in order to achieve the same return temperature of a support source with 90 bar without cooling oil. Without such a volume flow control, a substantially higher cooling oil amount would have to be supplied to obtain the same mixed temperature. It is also no longer necessary, as in the previously described case, to lower the return temperature of all support sources to an unnecessarily low amount so that, moreover, the drive power of the roll can be kept low. An alternative raising of the inlet temperatures to avoid this problem would further increase the total volume flow of the roll.

The solution in accordance with the invention thus provides the advantage of a reduction in the required cooling fluid flow in addition to the advantage of a temperature homogenization.

An alternative advantageous embodiment of the deflection controlled roll in accordance with the invention is characterized in that a variable steering of a fluid volume flow supplied locally to a respective roll zone by the temperature influencing device is provided which is controlled in dependence on the piston pressure of the relevant support element or of the relevant support element group. In this connection, the steering of the fluid volume flow can in particular be controlled by the piston pressure itself. The steering of the fluid volume flow can take place via variable metal sheets, for example.

In an expedient practical embodiment, the fluid delivered by the temperature influencing device is supplied to an annular space enclosing the pocket region of the respective hydrostatic support element. This produces the advantage that the fluid serving for the temperature influencing can be supplied independently of the direction of roll rotation via a supply line. To keep the pressure in the annular space or the annular passage and the friction as low as possible, the width of the web outwardly bounding the annular space is much smaller than the width of the web provided between this annular space and the pocket region. The further advantage thus results that, even with a roll made completely empty, sufficient fluid is available in the inlet of the support source which is brought in at high speed beneath the support source.

The present invention is directed to a deflection controlled roll that includes a rotating roll jacket, a rotationally fixed yoke arranged to axially pass through the roll jacket, and a plurality of hydrostatic support elements arranged on the yoke in a direction of a roll axis which are chargeable with a pressure fluid to exert a supporting force on an inner side of the roll jacket. A device for influencing a roll temperature via at least one fluid flow, which is separate from the pressure fluid is also included. The support elements are arranged into a plurality of controllable roll zones arranged along the roll axis. The temperature influencing device is structured and arranged to locally charge respective roll zones depending upon a pressure on the support elements in a respective roll zone.

In accordance with a feature of the invention, the support elements can be arranged in series along the roll axis.

According to another feature of the present invention, the support elements can include piston in cylinder units. Each roll zone can include an individual piston in cylinder unit and the local charging of each roll zone may depend upon the piston pressure. Further, the support elements may be structured and arranged to be individually controllable. Moreover, each roll zone can include a group of piston in cylinder units, whereby the local charging of each roll zone depends upon the piston pressure of the group. The groups may be structured and arranged to be individually controllable.

In accordance with still another feature, the temperature influencing device can be structured and arranged to charge at least some of the roll zones with a cooling fluid.

Additionally, or alternatively, the temperature influencing device can be structured and arranged to charge at least some of the roll zones with a heating fluid.

The temperature influencing device may be structured and arranged to supply a varied fluid amount to each the roll zone depending upon the on the support elements.

Further, the at least one support element may include a piston in cylinder unit and the temperature influencing device may be structured and arranged to supply a varied fluid amount to each the roll zone depending upon a piston pressure.

The roll jacket and yoke can be arranged to form an annular space, and the temperature influencing device may be arranged to charge the annular space for the at least one roll zone with the at least one fluid flow.

The temperature influencing device can include nozzles structured and arranged to inject the at least one fluid flow into the at least one roll zone. Further, the at least one support element can include a piston in cylinder unit and a respective valve position before each of the nozzles and a respective fluid flow amount may be controllable depending upon piston pressure. A respective valve can be positioned before each of the nozzles and a respective fluid flow amount may be controllable depending upon a respective piston pressure. The respective valve can be structured to increasingly close as piston pressure becomes increasingly higher, and the respective valve can be structured to increasingly open as piston pressure becomes increasingly lower. Further, the respective valve may be structured to be controllable such that it is at least one of: at least substantially fully closed at a piston pressure above a pre-settable upper limiting value and at least substantially fully open at a piston pressure below a pre-settable lower limiting value. Still further, a cross-section of the respective valve may be variable via a spring-loaded valve body which can be charged against a spring force by the piston pressure. A cross-section of the respective nozzle can be matched to a size of a respective support element in order to produce a constant mixed temperature at an interior of the roll jacket.

Still further, the respective valve can be structured to increasingly close as pressure on the support elements becomes increasingly higher, and the respective valve is structured to increasingly open as pressure on the support elements becomes increasingly lower. Also, the respective valve can be structured to be controllable such that it is at least one of: at least substantially fully closed at a pressure above a pre-settable upper limiting value on the supporting elements and at least substantially fully open at a pressure below a pre-settable lower limiting value on the support elements. Moreover, a cross-section of the respective valve can be variable via a spring-loaded valve body which can be charged against a spring force by the pressure on the support elements to support the roll jacket. A cross-section of the respective nozzle may be matched to a size of a respective support element in order to produce a constant mixed temperature at an interior of the roll jacket.

According to still another feature of the present invention, the temperature influencing device can be arranged to controllably and locally supply a variable steering of the fluid flow to respective roll zone depending upon a pressure on the at least one support element supporting the roll jacket.

Further, the at least one support element may include a piston in cylinder unit and the steering of the fluid flow is controlled by piston pressure.

According to another feature, the steering of the fluid flow may take place via variable guide plates.

The at least one support element can include an annular space surrounding a pocket region, and the fluid flow supplied by the temperature influencing device can be supplied to the annular space. A width of a web outwardly bounding the annular space may be smaller than a width of a web located between the annular space and the pocket region.

In accordance with still yet another feature of the present invention, at least one of the pressure fluid and the fluid flow comprises oil.

The invention is directed to a process for operating a deflection controlled roll that includes a rotating roll jacket, a rotationally fixed yoke arranged to axially pass through the roll jacket, and a plurality of hydrostatic support elements arranged on the yoke in a direction of a roll axis. The process includes arranging the plurality of hydrostatic support elements into a plurality of controllable roll zones along the roll axis, charging the plurality of hydrostatic support elements of each controllable roll zone with a pressure fluid to exert a supporting force on an inner side of the roll jacket, and supplying at least one fluid flow, which is separate from the pressure fluid, into each controllable roll zone depending upon a pressure on the plurality of hydrostatic support elements in a respective controllable roll zone.

In accordance with still yet another feature of the present invention, the hydrostatic support elements can include piston in cylinder units, and the process may further include supplying the at least one fluid flow depending upon the piston pressure. The piston pressure and the at least one fluid flow supply are inversely proportional.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention, the description taken with the drawings making apparent to those skilled in the art how the several forms of the present invention may be embodied in practice.

Figure 1:
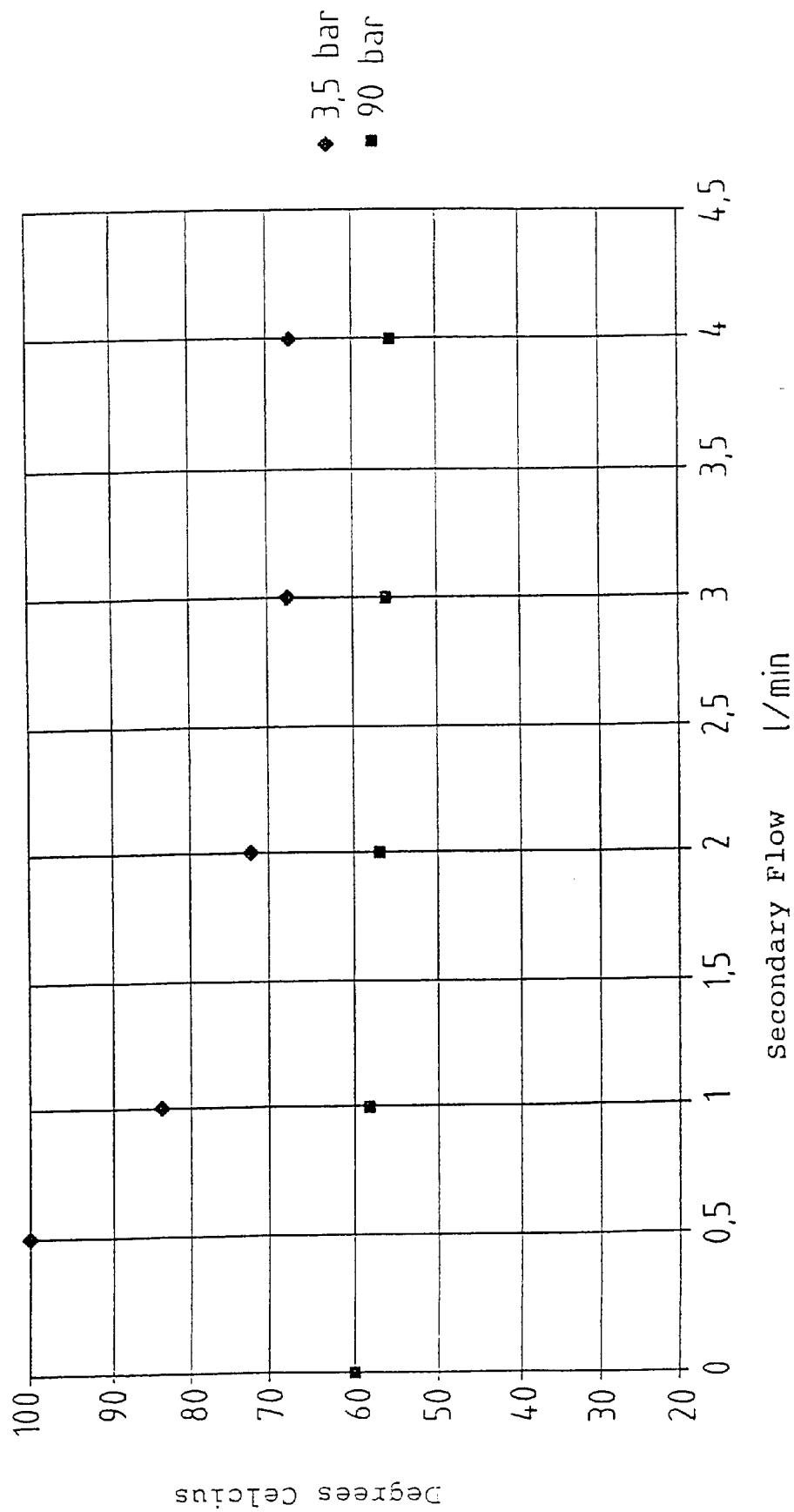
FIG. 1 illustrates a diagram in which the respective oil temperature resulting after a support source is shown for two different piston pressures over the cooling oil flow (secondary flow)
Figure 2:
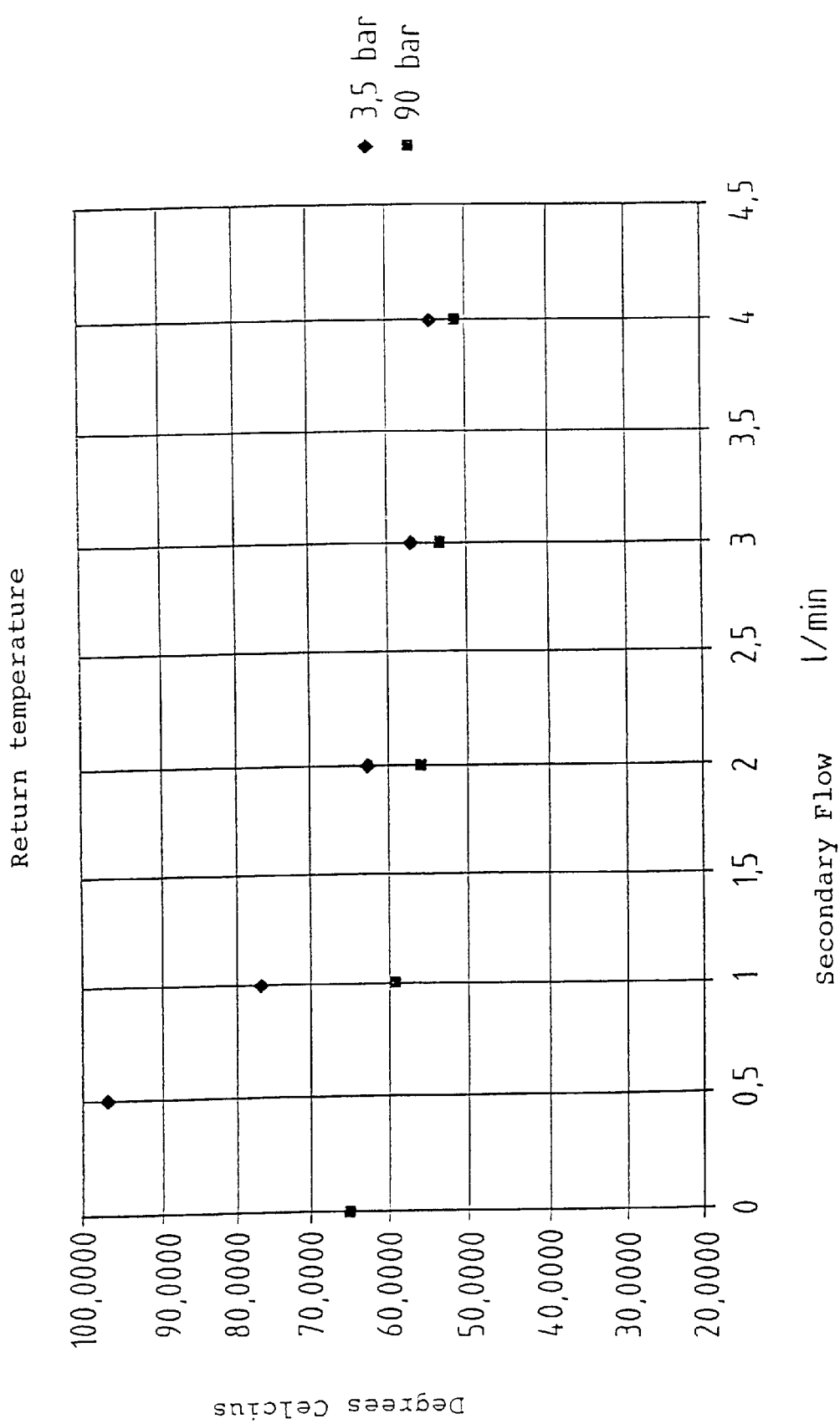
FIG. 2 illustrates a diagram in which the respective calculated return temperature is shown for two different piston pressures over the cooling oil flow (secondary flow)
Figure 3:
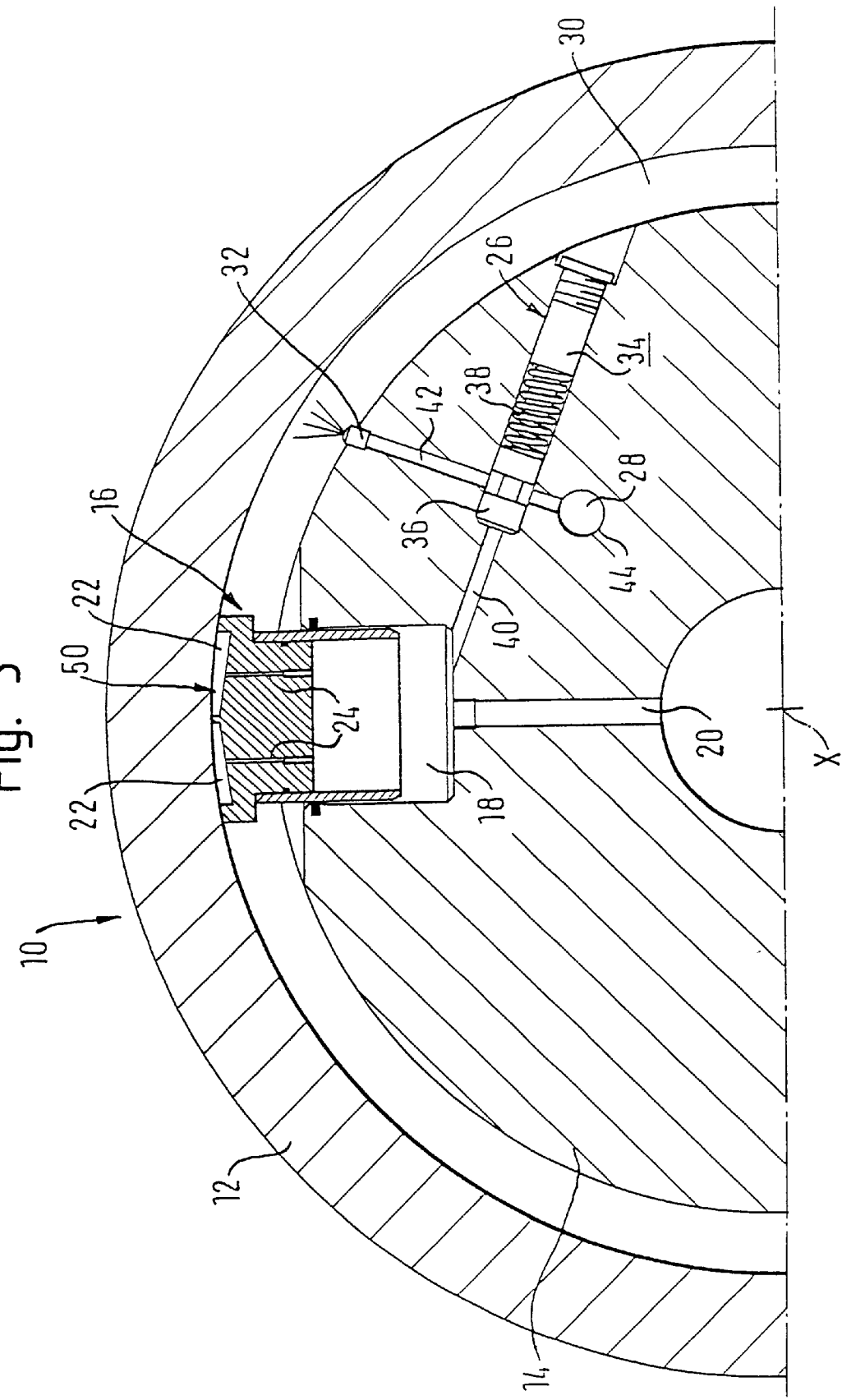
FIG. 3 schematically illustrates a sectioned part representation of an embodiment of a deflection controlled roll in accordance with the invention.

FIG. 3 shows, in a schematic sectioned part representation, an exemplary embodiment of a deflection controlled roll in accordance with the invention which can serve for the treatment of a material web such as in particular of a paper web or of a cardboard web in a nip (not shown) formed with a counter surface.

Deflection controlled roll 10 includes a rotating roll jacket 12, a rotationally fixed yoke (support) 14 axially passing through the roll jacket 12 and a plurality of support elements 16 which are arranged in series on yoke 14 in the direction of a roll axis X and of which only one can be recognized in FIG. 3.

Support elements 16 are each formed by a piston in cylinder unit actuated by pressure fluid and exerting a respective supporting force on an inner side of roll jacket 12.

Support elements 16 can be controlled individually and/or groupwise, whereby corresponding roll zones are successively arranged adjacent one another in the direction of roll axis X.

Pressure space 18 of a respective support element 16 can be charged with pressure fluid via a passage 20 provided in yoke 14. Hydrostatic pockets 22 at the jacket side are each supplied with pressure fluid via at least one restrictor or capillary 24. In this connection, restrictors 24 are disposed in the present case between hydrostatic pockets 22 and pressure space 18.

Figure 5:
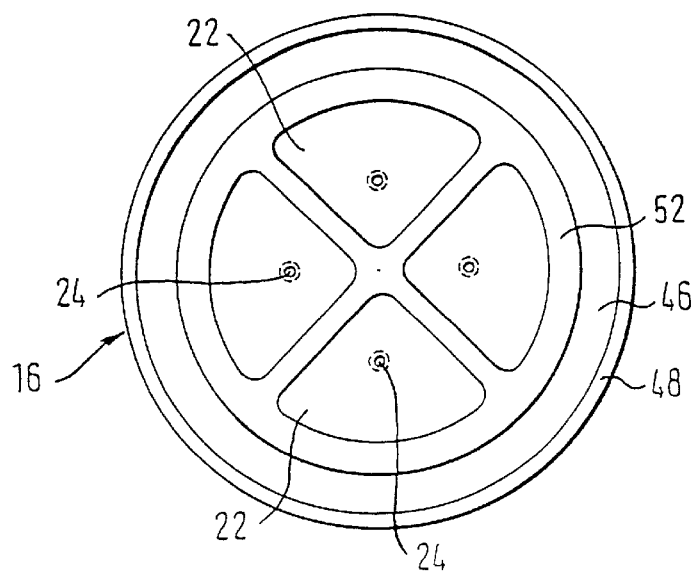
FIG. 5 schematically illustrates plan view of the support element shown in FIG. 4.

In the present case, a respective support element 16 has, for example, four hydrostatic pockets 22 respectively (see, e.g., FIG. 5).

Moreover, deflection controlled roll 10 includes a device 26 for influencing the roll temperature via at least one fluid flow 28 which is separate from the pressure charge (fluid) of support elements 16. In the exemplary embodiment, fluid flow 28 is a cooling fluid flow.

A respective local charge of the different roll zones by temperature influencing device 26 takes place in dependence on the piston pressure of support element 16 of the respective roll zone. In the present case, the fluid amount supplied locally to a respective roll zone by temperature influencing device 26 can be varied in dependence on the piston pressure of relevant support element 16.

As can be recognized from FIG. 3, annular spaces 30 of the different roll zones provided between roll jacket 12 and yoke 14 can be charged with cooling fluid 28, here cooling oil. Temperature influencing device 26 in the present case includes nozzles 32 via which the cooling fluid can be injected into the respective roll zones or annular spaces 30.

In this connection, a respective valve 34 is disposed before each of the nozzles 32 and the respective fluid amount can be controlled via this in dependence on the respective piston pressure. Valve 34 is expediently designed such that it increasingly closes as the piston pressures become increasingly higher and vice versa.

Valve 34 can in particular be designed and/or controllable such that it is at least substantially fully closed at piston pressures above a presettable upper limiting value and is at least substantially fully open at piston pressures below a presettable lower limiting value.

As can be recognized from FIG. 3, in the present case the valve cross section can be varied via a spring-loaded valve body 36 which can be charged against the force of a spring 38 by the piston pressure, i.e. by the pressure in pressure space 18. For this purpose, respective valve 34 is connected to pressure space 18 via a passage 40. Respective valve 34, like passage 40, can be formed in yoke 14. Nozzle 32 serving for the cooling oil distribution is connected via a passage 42 to a line 44 inside yoke 14 conducting fluid flow 28. As can be recognized from FIG. 3, valve 34 is switched on in passage 42. As the piston pressure increases, valve body 36 is displaced to the right, whereby the valve cross-section is reduced. As the piston pressure decreases, valve body 36 is moved back to the left by the spring, whereby the valve cross-section is accordingly increased.

In the present case, valve 34 is therefore disposed before each nozzle 32 which injects oil into annular space 30 of a respective support element 16. Valve 34 controls the supplied cooling oil amount in dependence on the piston pressure prevailing in pressure space 18. The design of valve 34 can take place such that the cooling oil flow is stepped down to zero at high pressures and that the valve cross-section is fully open at minimum piston pressures. A constant mixed temperature at the interior of the roll can thus be produced by a design of the nozzle cross-section matched to the support element size.

Figure 4:
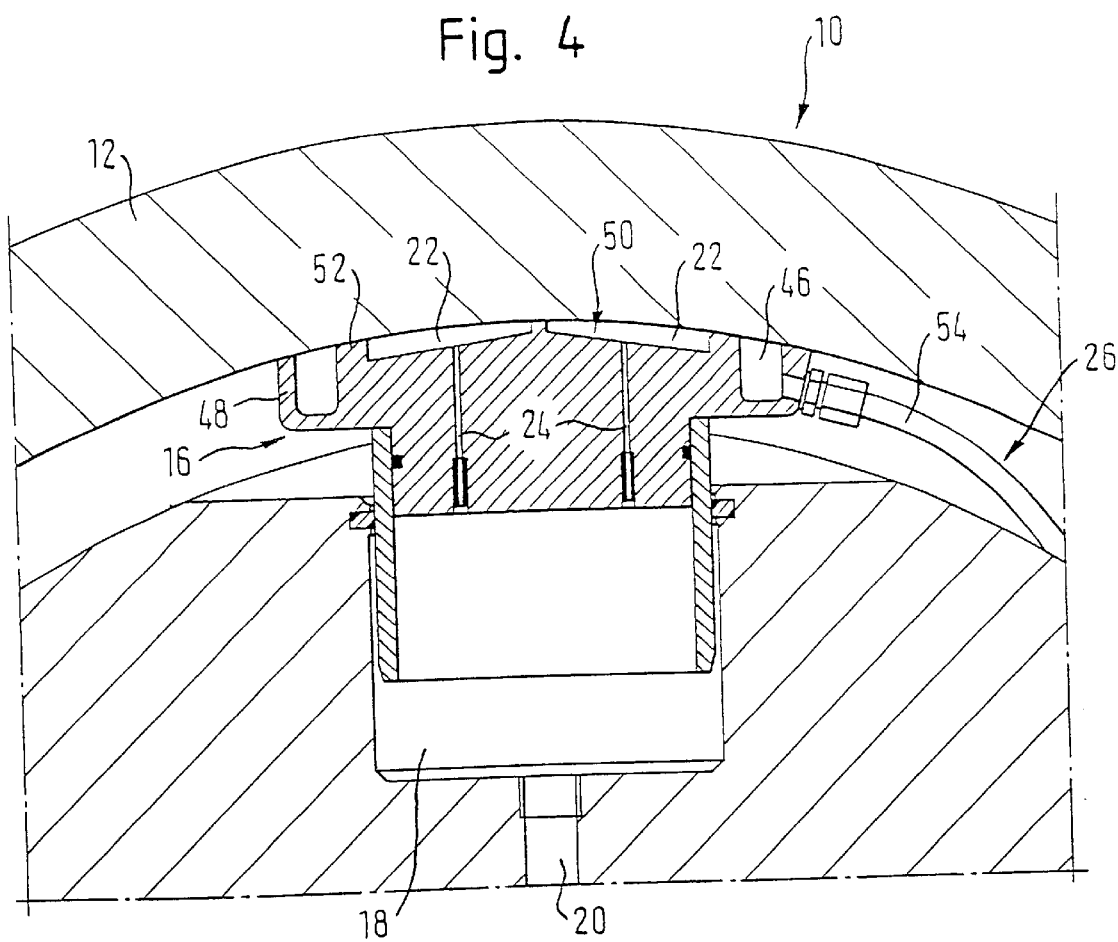
FIG. 4 schematically illustrates a sectioned part representation of a further embodiment of a deflection controlled roll in accordance with the invention.

FIGS. 4 and 5 show a modified embodiment of deflection controlled roll 10 in accordance with the invention in which the fluid delivered by temperature influencing device 26 is supplied to an annular space 46 surrounding pocket region 50 of respective hydrostatic support element 16. As can be recognized from FIGS. 4 and 5, in this connection the width of web 48 outwardly bounding annular space 46 is much smaller than the width of web 52 provided between annular space 46 and pocket region 50.

The present embodiment produces the advantage that the cooling oil can be supplied independently of the direction of roll rotation via a supply line 54. Since outer web 48 is substantially smaller than inner web 52, the pressure in annular passage 46 and the friction can be kept small. A further advantage of this embodiment lies in the fact that, even with roll made completely empty, sufficient cooling oil is available in the inlet of the support element 16 which can be brought in at high speed beneath support element 16.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Reference Numeral List
10 deflection controlled roll
12 roll jacket
14 yoke
16 support element
18 pressure space
20 passage
22 hydrostatic pocket
24 restrictor, capillary 26 temperature influencing device
28 fluid flow
30 annular space
32 nozzle
34 valve
36 valve body
38 spring
40 passage
42 passage
44 line
46 annular space
48 web
50 pocket region
52 web
54 supply line
X roll axis

What is claimed:

1. A deflection controlled roll comprising:
a rotating roll jacket;
a rotationally fixed yoke arranged to axially pass through said roll jacket;
a plurality of hydrostatic support elements arranged on said yoke in a direction of a roll axis which are chargeable with a pressure fluid to exert a supporting force on an inner side of said roll jacket;
a device for influencing a roll temperature via at least one fluid flow, which is separate from the pressure fluid;
said support elements being arranged into a plurality of controllable roll zones arranged along said roll axis,
wherein said temperature influencing device is structured and arranged to locally charge roll zones depending upon a pressure on said support elements in a respective roll zone.

2. The deflection controlled roll in accordance with claim 1, wherein said support elements are arranged in series along said roll axis.

3. The deflection controlled roll in accordance with claim 1, wherein said support elements comprise piston in cylinder units.

4. The deflection controlled roll in accordance with claim 3, wherein each roll zone comprises an individual piston in cylinder unit and the local charging of each roll zone depends upon the piston pressure.

5. The deflection controlled roll in accordance with claim 4, wherein said support elements are structured and arranged to be individually controllable.

6. The deflection controlled roll in accordance with claim 3, wherein each roll zone comprises a group of piston in cylinder units, whereby the local charging of each roll zone depends upon the piston pressure of the group.

7. The deflection controlled roll in accordance with claim 6, wherein said groups are structured and arranged to be individually controllable.

8. The deflection controlled roll in accordance with claim 1, wherein said temperature influencing device is structured and arranged to charge at least some of said roll zones with a cooling fluid.

9. The deflection controlled roll in accordance with claim 1, wherein said temperature influencing device is structured and arranged to charge at least some of said roll zones with a heating fluid.

10. The deflection controlled roll in accordance with claim 1, wherein said temperature influencing device is structured and arranged to supply a varied fluid amount to each said roll zone depending upon on the pressure on said respective support elements.

11. The deflection controlled roll in accordance with claim 1, wherein the at least one support element comprises a piston in cylinder unit and said temperature influencing device is structured and arranged to supply a varied fluid amount to each said roll zone depending upon a piston pressure.

12. The deflection controlled roll in accordance with claim 1, wherein the roll jacket and yoke are arranged to form an annular space, and said temperature influencing device is arranged to charge the annular space for said at least one roll zone with said at least one fluid flow.

13. The deflection controlled roll in accordance with claim 1, wherein said temperature influencing device includes nozzles structured and arranged to inject said at least one fluid flow into said at least one roll zone.

14. The deflection controlled roll in accordance with claim 13, wherein the at least one support element comprises a piston in cylinder unit and a respective valve position before each of said nozzles and a respective fluid flow amount is controllable depending upon piston pressure.

15. The deflection controlled roll in accordance with claim 14, wherein a respective valve is positioned before each of said nozzles and a respective fluid flow amount is controllable depending upon a respective piston pressure.

16. The deflection controlled roll in accordance with claim 15, wherein said respective valve is structured to increasingly close as piston pressure becomes increasingly higher, and
wherein said respective valve is structured to increasingly open as piston pressure becomes increasingly lower.

17. The deflection controlled roll in accordance with claim 15, wherein said respective valve is structured to be controllable such that it is at least one of: at least substantially fully closed at a piston pressure above a pre-settable upper limiting value and at least substantially fully open at a piston pressure below a pre-settable lower limiting value.

18. The deflection controlled roll in accordance with claim 15, wherein a cross-section of said respective valve is variable via a spring-loaded valve body which can be charged against a spring force by the piston pressure.

19. The deflection controlled roll in accordance with claim 15, wherein a cross-section of said respective nozzle is matched to a size of a respective support element in order to produce a constant mixed temperature at an interior of said roll jacket.

20. The deflection controlled roll in accordance with claim 13, wherein a respective valve is positioned before each of said nozzles and a respective fluid flow amount is controllable depending upon a respective pressure on said support elements.

21. The deflection controlled roll in accordance with claim 20, wherein said respective valve is structured to increasingly close as pressure on said support elements becomes increasingly higher, and
wherein said respective valve is structured to increasingly open as pressure on said at least one support element becomes increasingly lower.

22. The deflection controlled roll in accordance with claim 20, wherein said respective valve is structured to be controllable such that it is at least one of:
at least substantially fully closed at a pressure above a pre-settable upper limiting value on said supporting elements and at least substantially fully open at a pressure below a pre-settable lower limiting value on said support elements.

23. The deflection controlled roll in accordance with claim 20, wherein a cross-section of said respective valve is variable via a spring-loaded valve body which can be charged against a spring force by the pressure on said support elements to support said roll jacket.

24. The deflection controlled roll in accordance with claim 20, wherein a cross-section of said respective nozzle is matched to a size of a respective support element in order to produce a constant mixed temperature at an interior of said roll jacket.

25. The deflection controlled roll in accordance with claim 1, wherein said temperature influencing device is arranged to controllably and locally supply a variable steering of said fluid flow to respective roll zone depending upon a pressure on the at least one support element supporting said roll jacket.

26. The deflection controlled roll in accordance with claim 1, wherein the at least one support element comprises a piston in cylinder unit and the steering of the fluid flow is controlled by piston pressure.

27. The deflection controlled roll in accordance with claim 1, wherein the steering of the fluid flow takes place via variable guide plates.

28. The deflection controlled roll in accordance with claim 1, wherein the at least one support element comprises an annular space surrounding a pocket region, and said fluid flow supplied by said temperature influencing device is supplied to said annular space.

29. The deflection controlled roll in accordance with claim 28, wherein a width of a web outwardly bounding said annular space is smaller than a width of a web located between said annular space and said pocket region.

30. The deflection controlled roll in accordance with claim 1, wherein at least one of said pressure fluid and said fluid flow comprises oil.

31. A process for operating a deflection controlled roll that includes a rotating roll jacket, a rotationally fixed yoke arranged to axially pass through the roll jacket, and a plurality of hydrostatic support elements arranged on the yoke in a direction of a roll axis, the process comprising:

arranging the plurality of hydrostatic support elements into a plurality of controllable roll zones along the roll axis;

charging the plurality of hydrostatic support elements of each controllable roll zone with a pressure fluid to exert a supporting force on an inner side of the roll jacket; and supplying at least one fluid flow, which is separate from the pressure fluid, into each controllable roll zone depending upon a pressure on the plurality of hydrostatic support elements in a respective controllable roll zone.

32. The process in accordance with claim 31, wherein the hydrostatic support elements include piston in cylinder units, and the process further includes supplying the at least one fluid flow depending upon the piston pressure.

33. The process in accordance with claim 32, wherein the piston pressure and the at least one fluid flow supply are inversely proportional.

* * * * *